(12) United States Patent
Wong et al.

(10) Patent No.: US 12,149,359 B2
(45) Date of Patent: *Nov. 19, 2024

(54) INFRASTRUCTURE EQUIPMENT, WIRELESS TELECOMMUNICATIONS SYSTEM AND METHOD FOR HALF DUPLEX FREQUENCY DIVISION DUPLEXING

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,120

(22) Filed: Jul. 17, 2023

(65) Prior Publication Data

US 2023/0361925 A1 Nov. 9, 2023

Related U.S. Application Data

(63) Continuation of application No. 17/750,477, filed on May 23, 2022, now Pat. No. 11,705,992, which is a (Continued)

(30) Foreign Application Priority Data

Sep. 30, 2016 (EP) ..................................... 16191974

(51) Int. Cl.
*H04L 1/16* (2023.01)
*H04L 1/1607* (2023.01)
(Continued)

(52) U.S. Cl.
CPC .......... *H04L 1/1685* (2013.01); *H04L 1/1812* (2013.01); *H04L 1/1854* (2013.01); (Continued)

(58) Field of Classification Search
CPC ... H04L 1/1685; H04L 1/1812; H04L 1/1854; H04L 1/1896; H04L 5/0044; H04L 5/0055; H04L 5/0092
See application file for complete search history.

(56) References Cited

U.S. PATENT DOCUMENTS 7,774,686 B2    8/2010   Ahn et al.
8,756,477 B2    6/2014   Challa et al.
(Continued)

OTHER PUBLICATIONS

Texas Instruments et al., "Explicit DTX Signaling with ACK/NAK Bundling in TDD", 3GPP TSG RAN WG1 No. 52bis R1-081373, Shenzhen, China, Mar. 31-Apr. 4, 2008, pp. 1-4.
(Continued)

*Primary Examiner* — Justin R Knapp
(74) *Attorney, Agent, or Firm* — XSENSUS LLP

(57) ABSTRACT

An infrastructure equipment that transmits signals representing data via a wireless access interface to a communications device and receives signals representing data via the wireless access interface from the communications device in accordance with a time divided structure in which the wireless access interface is divided into a plurality of repeating time units. The infrastructure equipment provides, in each of a first plurality of the time units, one of a plurality of control channels each configured to schedule one of a plurality of data channels, and provides, in each of a second plurality of time units of the signal transmitted to the communications device, one of the plurality of data channels, the plurality of data channels being formed of one or more bundles of data channels, wherein the infrastructure (Continued)

equipment transmits a bundle status indicator in one or more of the plurality of control channels.

18 Claims, 7 Drawing Sheets

Related U.S. Application Data continuation of application No. 17/098,488, filed on Nov. 16, 2020, now Pat. No. 11,343,021, which is a continuation of application No. 16/334,748, filed as application No. PCT/EP2017/073461 on Sep. 18, 2017, now Pat. No. 10,841,041.

(51) Int. Cl.
    *H04L 1/18*     (2023.01)
    *H04L 1/1812*     (2023.01)
    *H04L 1/1829*     (2023.01)
    *H04L 1/1867*     (2023.01)
    *H04L 5/00*     (2006.01)

(52) U.S. Cl.
    CPC .......... *H04L 1/1896* (2013.01); *H04L 5/0044* (2013.01); *H04L 5/0055* (2013.01); *H04L 5/0092* (2013.01)

(56) References Cited

U.S. PATENT DOCUMENTS

| | | | |
|---|---|---|---|
| 8,775,909 B2 | 7/2014 | Ogawa et al. | |
| 9,172,509 B2 | 10/2015 | Zhang et al. | |
| 9,591,519 B2 | 3/2017 | Takeda et al. | |
| 10,419,165 B2 * | 9/2019 | Nigam | H04L 1/1819 |
| 10,880,905 B2 | 12/2020 | Xu | |
| 2009/0307554 A1 | 12/2009 | Marinier et al. | |
| 2011/0170498 A1 | 7/2011 | Liu et al. | |
| 2014/0040694 A1 | 2/2014 | Verma et al. | |
| 2015/0124666 A1 | 5/2015 | Ahn et al. | |
| 2015/0358115 A1 | 12/2015 | Wang et al. | |
| 2016/0254900 A1 | 9/2016 | Ahn et al. | |
| 2019/0349942 A1 | 11/2019 | Li et al. | |
| 2020/0059330 A1 | 2/2020 | Wong et al. | |

OTHER PUBLICATIONS

Sony, "Higher data rate for feMTC", 3GPP TSG RAN WG1 Meeting No. 86 R1-166660, Gothenburg, Sweden, Aug. 22-26, 2016, 5 pages.

NTT Docomo, "Views on techniques to improve the data rate for Rel-14 MTC", 3GPP TSG RAN WG1 Meeting No. 86 R1-167352, Gothenburg, Sweden, Aug. 22-26, 2016, pp. 1-4.

Ericsson, "New WI proposal on Further Enhanced MTC", 3GPP TSG RAN Meeting No. 72 RP-161321 Revision of RP-161319, Busan, Korea, Jun. 13-16, 2016, 7 pages.

Vodafone et al., "New work item proposal: Enhancements of NB-IoT", 3GPP TSG RAN Meeting No. 72 RP-161324, Busan, Korea, Jun. 13-16, 2016, 8 pages.

Holma et al., "LTE for UMTS OFDMA and SC-FDMA Based Radio Access", Wiley 2009, System Architecture Based on 3GPP SAE, 11 pages.

Sierra Wireless, "Ack Bundling Design Considerations", 3GPP TSG RAN WG1 Meeting No. 86 RP-166680, Gothenburg, Sweden, Aug. 22-26, 2016, 6 pages.

International Search Report mailed on Nov. 21, 2017, PCT/EP2017/073461, filed on Sep. 18, 2017, 11 pages.

\* cited by examiner

INFRASTRUCTURE EQUIPMENT, WIRELESS TELECOMMUNICATIONS SYSTEM AND METHOD FOR HALF DUPLEX FREQUENCY DIVISION DUPLEXING

CROSS-REFERENCE TO RELATED APPLICATIONS

This application is a continuation of U.S. application Ser. No. 17/750,477, filed May 23, 2022, which is a continuation of U.S. application Ser. No. 17/098,488, filed Nov. 16, 2020 (now U.S. Pat. No. 11,343,021), which is a continuation of U.S. application Ser. No. 16/334,748, filed Mar. 20, 2019 (now U.S. Pat. No. 10,841,041), which is based on PCT filing PCT/EP2017/073461, filed Sep. 18, 2017, and claims priority to EP 16191974.1, filed Sep. 30, 2016, the entire contents of each are incorporated herein by reference.

BACKGROUND

Field of Disclosure

The present disclosure relates to infrastructure equipment forming part of a wireless telecommunications system for communicating with a communications device, and specifically to mechanisms for employing half duplex frequency division duplexing (HD-FDD) in such telecommunications systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, enhanced MTC (eMTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging. A similar class of devices is the Further Enhanced MTC (fe-MTC) [3]. Current areas of development are aimed at improving the operation of these types of low cost devices so that they are power efficient and can operate in extended coverage, such as inside basements [2][4]. One of the desires is to increase the throughput of the IoT devices, especially for devices using half-duplex frequency division duplexing (HD-FDD).

SUMMARY OF THE DISCLOSURE

According to an example embodiment of the present disclosure, there is provided an infrastructure equipment forming part of a wireless telecommunications system. The infrastructure equipment comprises transmitter circuitry for transmitting signals representing data via a wireless access interface of the wireless telecommunications system to a communications device, receiver circuitry for receiving signals representing data via the wireless access interface from the communications device, and controller circuitry configured to control the transmitter circuitry and the receiver circuitry to transmit and receive signals via the wireless access interface in accordance with a time divided structure in which the wireless access interface is divided into a plurality of repeating time units. The controller circuitry is also configured to provide, in each of a first plurality of the time units, one of a plurality of control channels each configured to schedule one of a plurality of data channels, and to provide, in each of a second plurality of time units of the signal transmitted to the communications device, one of the plurality of data channels, the plurality of data channels being formed of one or more bundles of data channels. The controller circuitry is configured to control the transmitter circuitry to transmit a bundle status indicator in one or more of the plurality of control channels.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
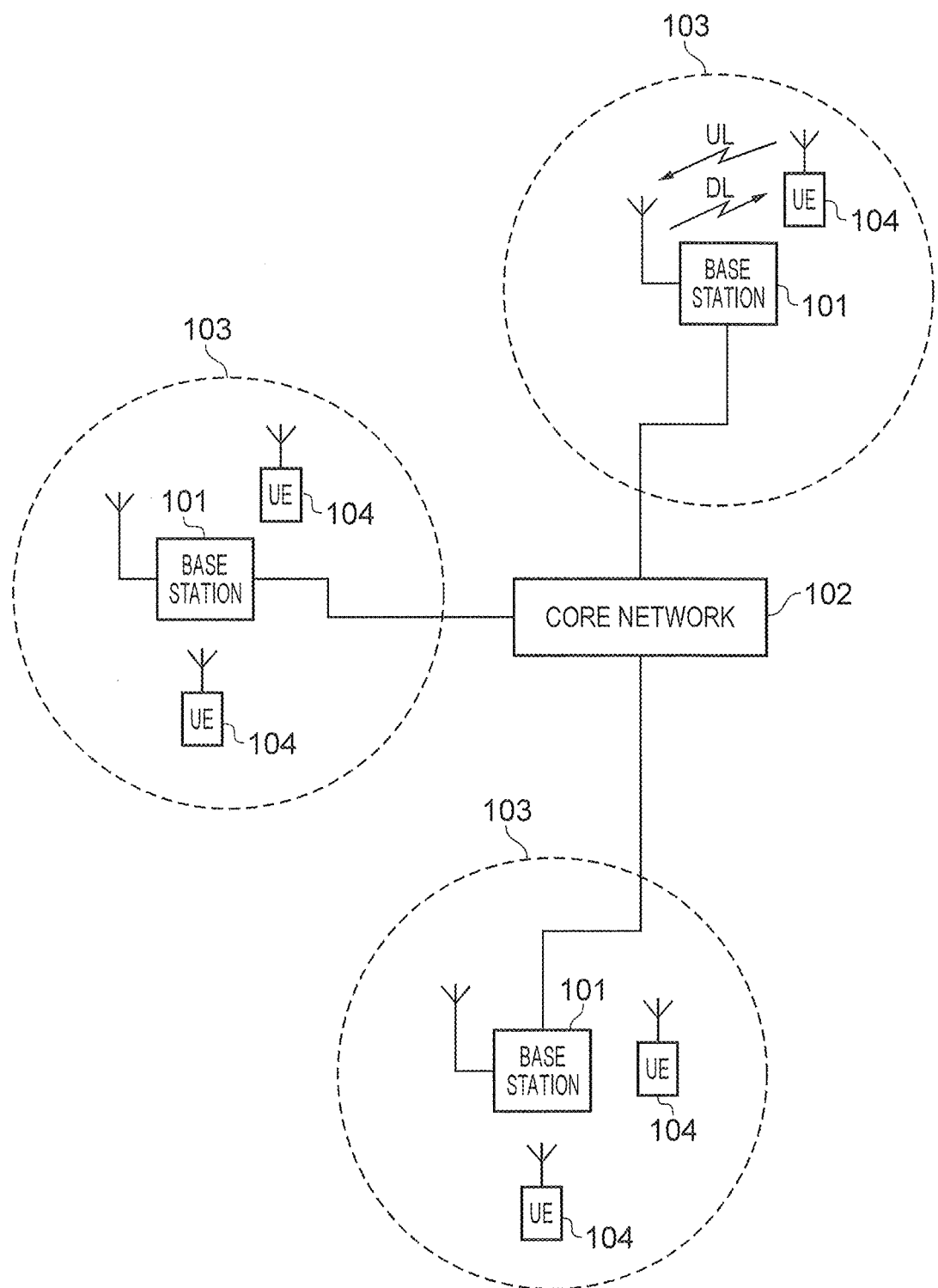
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A W. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced.

HD-FDD UEs and Telecommunications Systems

An half-duplex frequency division duplexing (HD-FDD) UE can either receive or transmit, but cannot perform both at the same time. It also needs to switch between frequency bands when it switches between transmitting and receiving. In Rel-13 eMTC, the HD-1-DD UE is expected to take 1 ms (i.e. one subframe) to switch between receive and transmit (downlink (DL) to uplink (UL)) and 1 ms (i.e. one subframe) to switch from transmit to receive (UL to DL). In Rel-13 eMTC, cross subframe scheduling is used for a physical downlink shared channel (PDSCH), in which an MTC-physical downlink control channel (MPDCCH) carrying downlink control information (DCI) for a downlink grant is transmitted in subframe n and the corresponding scheduled PDSCH is transmitted in subframe n+2 (shown by 206 in FIG. 2). Once the UE receives the PDSCH, it has three subframes to decode, generate a feedback (acknowledgement or negative acknowledgement (ACK/NACK)) and transmit this feedback with timing advance, i.e. it needs to transmit the physical uplink control channel (PUCCH) carrying the hybrid automatic repeat request (HARQ) feedback in subframe n+6; two subframes (shown by 206 in FIG. 2) between MPDCCH and PDSCH, plus four subframes (shown by 208 in FIG. 2) between PDSCH and PUCCH.

Figure 2:
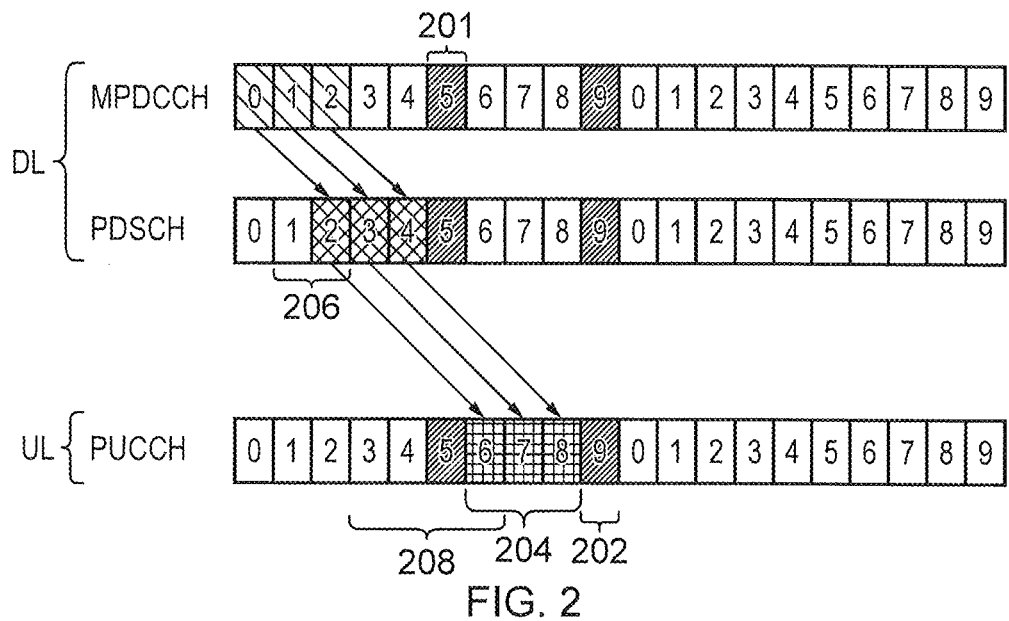
FIG. 2 illustrates an example of a Rel-13 eMTC HD-FDD PDSCH transmission.

An example of this is shown in FIG. 2, where in subframe 0, an MPDCCH carrying a downlink grant is transmitted and this is followed by a PDSCH in subframe 2. The UE would then transmit the PUCCH carrying the HARQ feedback 204 in subframe 6. DL to UL switching 201 for the transmitting device takes place in subframe 5, and UL to DL switching 202 for the receiving device takes place in subframe 9. In order to achieve peak throughput, an HD-FDD UE needs to transmit as many contiguous PDSCH as possible. Due to the timing constraints described, the HD-FDD UE can only transmit three contiguous PDSCH per radio frame (i.e. 10 subframes) as shown in FIG. 2. Since the maximum TBS (Transport Block Size) in Rel-13 eMTC is 1000 bits, the maximum downlink throughput that can be achieved by an HD-FDD UE is 300 kbps.

One of the methods to improve HD-FDD throughput is to introduce HARQ Feedback (HARQ-ACK) Bundling, where a single PUCCH (ACK/NACK) is used to acknowledge more than one PDSCH, i.e. a bundle of PDSCHs. An AND operation is used for the feedback; that is the UE sends:

An ACK if all of the PDSCHs in the bundle pass the CRC check; or

A NACK if one or more PDSCHs in the bundle fail the CRC check.

A known inefficiency of HARQ-ACK bundling is that if the eNB receives a NACK, it would not know which of the PDSCH(s) in the bundle failed to reach the UE since an AND operator is used for the feedback. In this case, the eNB has to retransmit all the PDSCH in the bundle.

Figure 3:
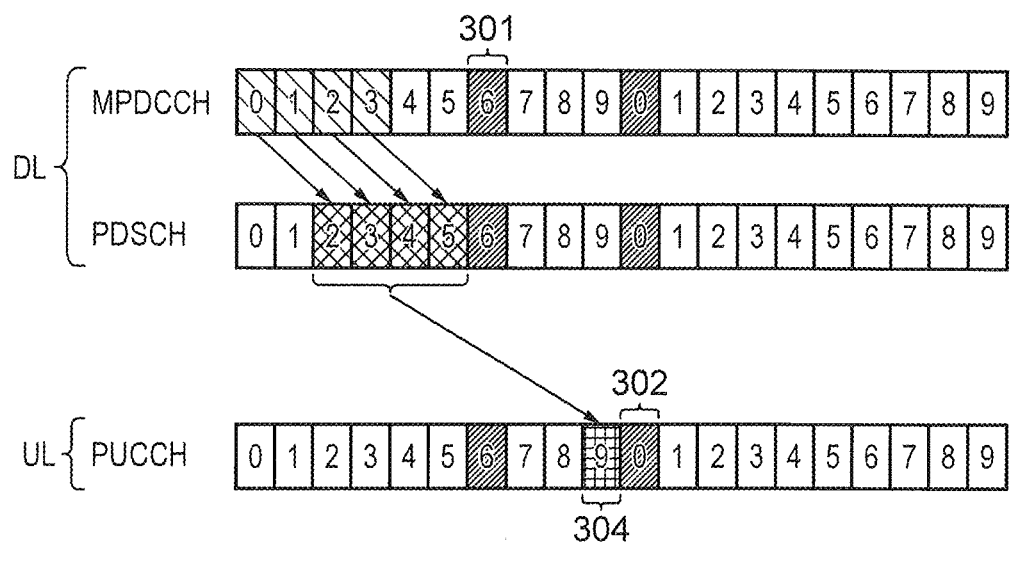
FIG. 3 illustrates an example of HARQ-ACK bundling with 4-PDSCH bundles in a Rel-13 eMTC HD-FDD PDSCH transmission.

In using HARQ-ACK bundling in fe-MTC, the four subframes timing relationship between PDSCH and PUCCH needs to be changed. For example in FIG. 3, a HARQ-ACK bundle size of 4 PDSCHs is used and here the PDSCH transmitted in subframe 2, 3 and 4 would not be able to provide the feedback four subframes later. In [4], it is suggested that only the last PDSCH in the PDSCH bundle (i.e. the PDSCH in subframe 5 of FIG. 3) conforms to the 4 subframe timing. That is the PUCCH is provided 4 subframes later after the last PDSCH in the PDSCH bundle (i.e. PUCCH providing the feedback 304 is transmitted in subframe 9 in FIG. 3). DL to UL switching 301 for the transmitting device takes place in subframe 6, and UL to DL switching 302 for the receiving device takes place in subframe 0 in the following radio frame. As shown in FIG. 3, using HARQ-ACK bundle size of 4, the UE maximum downlink throughput is increased to 364 kbps (assuming a maximum downlink TBS of 1000 bits).

Figure 4:
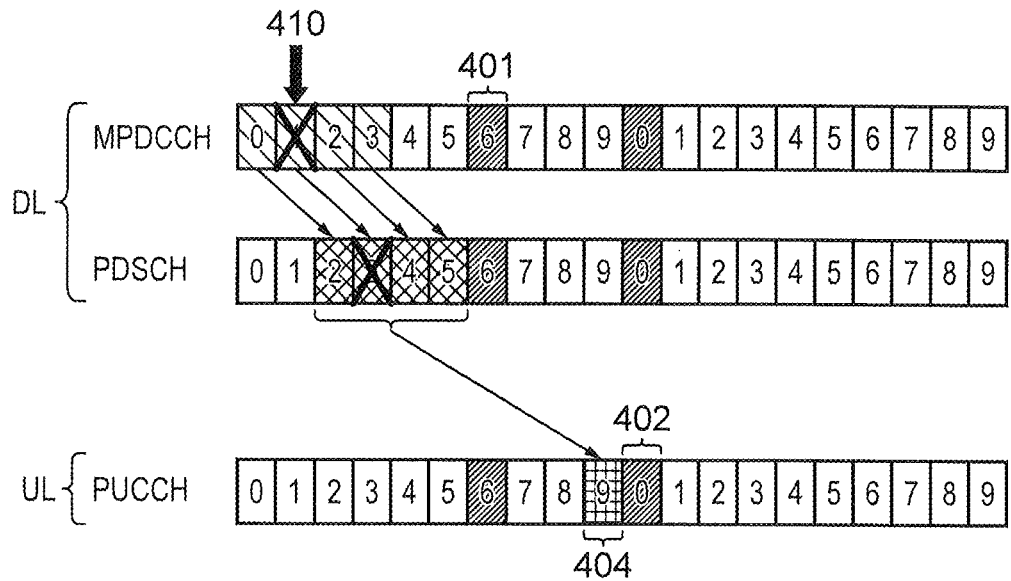
FIG. 4 illustrates an example of a missed MPDCCH detection in a PDSCH bundle transmitted as shown in FIG. 3.

As described previously, when a NACK is received, the eNB does not know which PDSCH(s) in the bundle is (are) not received correctly and it has to retransmit the entire bundle. Another issue with HARQ-ACK bundling is, even if an ACK is received, the eNB is not sure if the UE has received all the PDSCHs in the bundle since the UE may have missed one or more PDSCHs. For example in FIG. 4, an eNB transmits a bundle of four PDSCHs in subframes 2, 3, 4 & 5, which are scheduled by four corresponding MPDCCHs in subframes 0, 1, 2 & 3. Since the targeted block error rate (BLER) for MPDCCH is 1%, it is possible that the UE missed the detection of an MPDCCH. In this example, the UE missed MPDCCH 410 in subframe 1 thereby it will not decode PDSCH in subframe 3. The UE decodes the remaining PDSCHs (in subframe 2, 4 & 5) correctly and hence would feedback an ACK 404 in subframe 9 even though PDSCH in subframe 3 was not decoded. Again, in FIG. 4, DL to UL switching 401 for the transmitting device takes place in subframe 6, and UL to DL switching 402 for the receiving device takes place in subframe 0 in the following radio frame.

Figure 5:
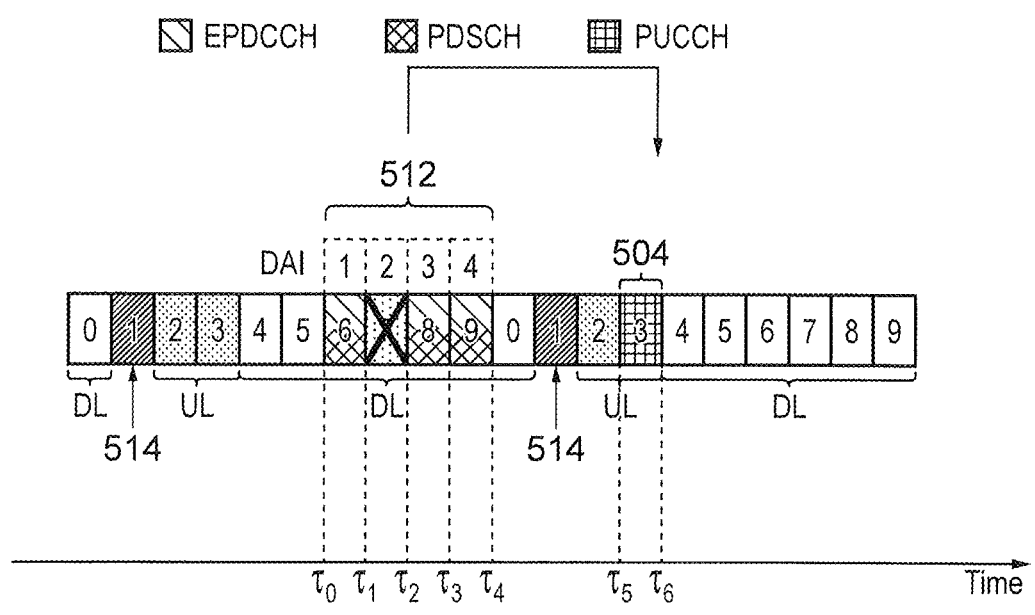
FIG. 5 illustrates a first example of a Downlink Assignment Index in LTE TDD.

HARQ-ACK bundling is employed in LTE time division duplexing (LTE TDD). In LTE TDD, the subframes used for uplink and downlink transmission are configured based on a set of subframe configurations. For each configuration, a HARQ bundling window is defined where any PDSCH scheduled in this window would be bundled for HARQ-ACK bundling. Recognising the missed PDSCH detection issue in HARQ-ACK bundling, in LTE TDD, a Downlink Assignment Index (DAI) is used in the downlink grant in the PDCCH/EPDCCH (downlink control information, DCI) when scheduling each of the PDSCH in the bundle. The DAI is a counter that increases as the number of scheduled PDSCH increases in the bundle. That is, the DAI indicates to the UE that a scheduled PDSCH is the $k^{th}$ PDSCH in the bundle. This enables the UE to determine if any PDSCH is missing in the bundle. An example is shown in FIG. 5, where a UL/DL subframe Configuration 4 is used. One of the fixed HARQ-ACK bundling windows 512 consists of (downlink) subframe 6, 7, 8 & 9 and their corresponding PUCCH carrying the HARQ-ACK 504 bundling is in subframe 3 in the following radio frame. In this example, the eNB transmit EPDCCH in subframe 6, 7, 8 & 9 between time $\tau_0$ and $\tau_4$, which schedules PDSCH in the same subframe. The DAI would indicate "1", "2", "3" and "4" for the PDSCH being scheduled in the DCI carried by the EPDCCH in subframe 6, 7, 8 & 9 respectively. The EPDCCH in subframe 7 (between time $\tau_1$ and $\tau_2$) is not detected by the UE and the corresponding PDSCH in the same subframe 7 is therefore not decoded. However, when the UE receives DCI in subframe 8 and 9 where the DAI indicates 3 and 4 respectively, the UE knows that the PDSCH transmitted in subframe 7 is missing and it would therefore feedback a NACK to the eNB in subframe 3 at time $\tau_5$. A special switching subframe 514 is introduced in place of subframe 1 in each radio frame, used for switching from DL to UL.

Figure 6:
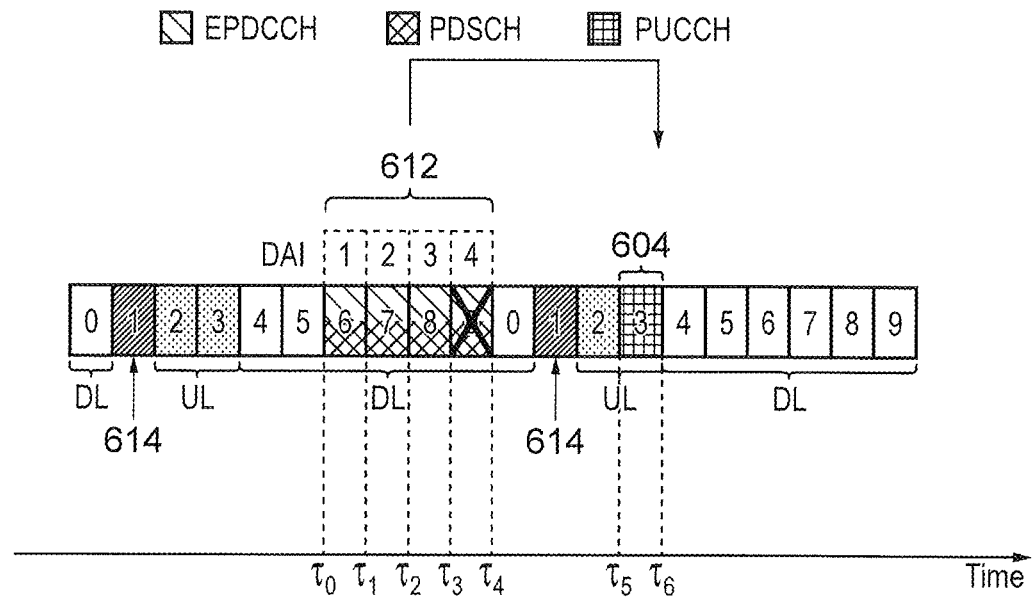
FIG. 6 illustrates a second example of a Downlink Assignment Index in LTE TDD.

The DAI can be used to determine for missing PDSCHs that has already been scheduled in the bundle but it cannot indicate whether the last PDSCH or last few PDSCHs are missing. For example, consider the same LTE TDD Configuration 4 in FIG. 6—with bundling window 612, HARQ-ACK 604 in subframe 3 in the following radio frame, and special subframes 614—where EPDCCH in subframe 9 at time $\tau_3$ is not detected leading to the corresponding PDSCH in subframe 9 not being decoded. The last detected EPDCCH and decoded PDSCH is in subframe 8, transmitted between time $\tau_2$ and $\tau_3$, and the DCI carried by the EPDCCH in subframe 8 indicates that 3 PDSCH has been scheduled leading to the UE to interpret that all PDSCH has been decoded and feedbacks an ACK to the eNB. This potential error scenario is overcome since the resource used to transmit the PUCCH (e.g. the code and frequency resources used in subframe 3 at time $\tau_5$) is a function of the subframe of the last detected PDSCH.

Unlike LTE TDD, fe-MTC HD-FDD does not have a fixed UL/DL subframe configuration, but instead the UE switches from DL to UL when there is an uplink transmission due to an UL grant or for HARQ feedback. Although a PDSCH bundle window similar to LTE TDD was proposed in [5], such a window would introduce restrictions on the eNB scheduling. In [6], a "Toggle Bit" is proposed where a single bit in the DCI would toggle between 0 and 1 for every successive PDSCH scheduled in a PDSCH bundle. This is designed to enable the UE to track for missing PDSCH, i.e. if the UE receives two consecutive 0s it knows that one PDSCH is missing. Embodiments of the present technique relate to a new mechanism for HD-FDD.

PDSCH Bundle Status (PBS)

Embodiments of the present technique introduce a PDSCH bundle status (PBS), or bundle status indicator, in the DCI that indicates the status of the MPDCCH/PDSCH bundle transmission to the UE.

Figure 7:
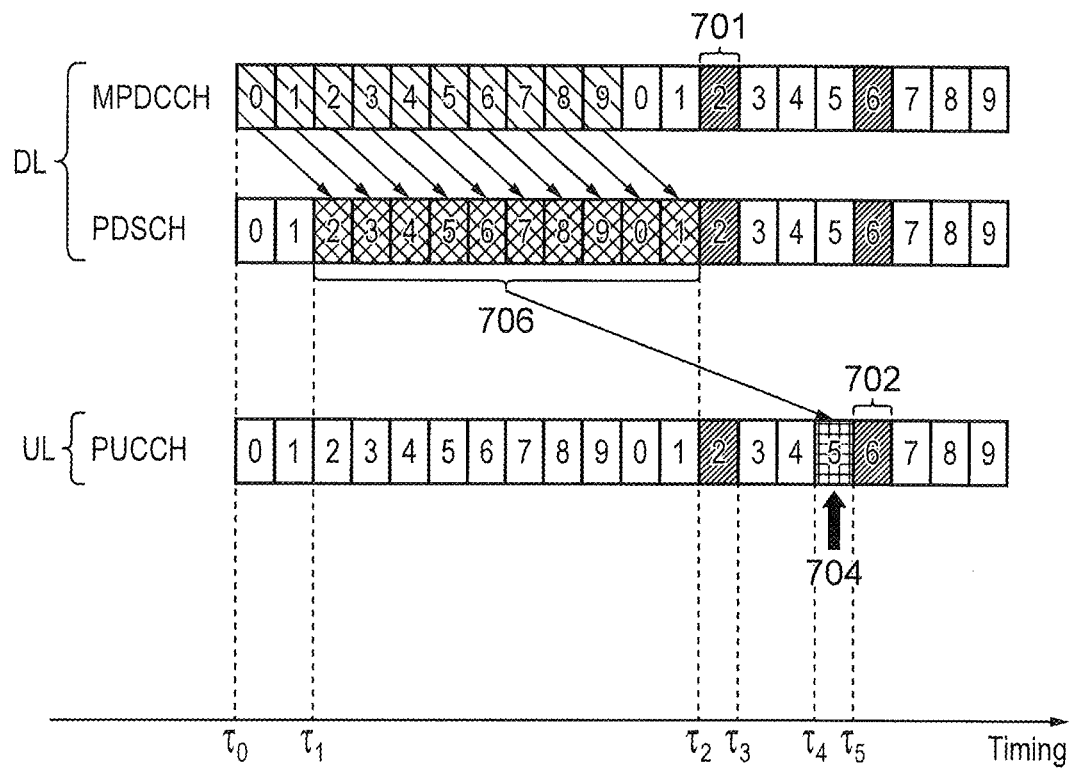
FIG. 7 illustrates an example of a PDSCH transmission for maximum throughput in accordance with embodiments of the present technique.
Figure 8:
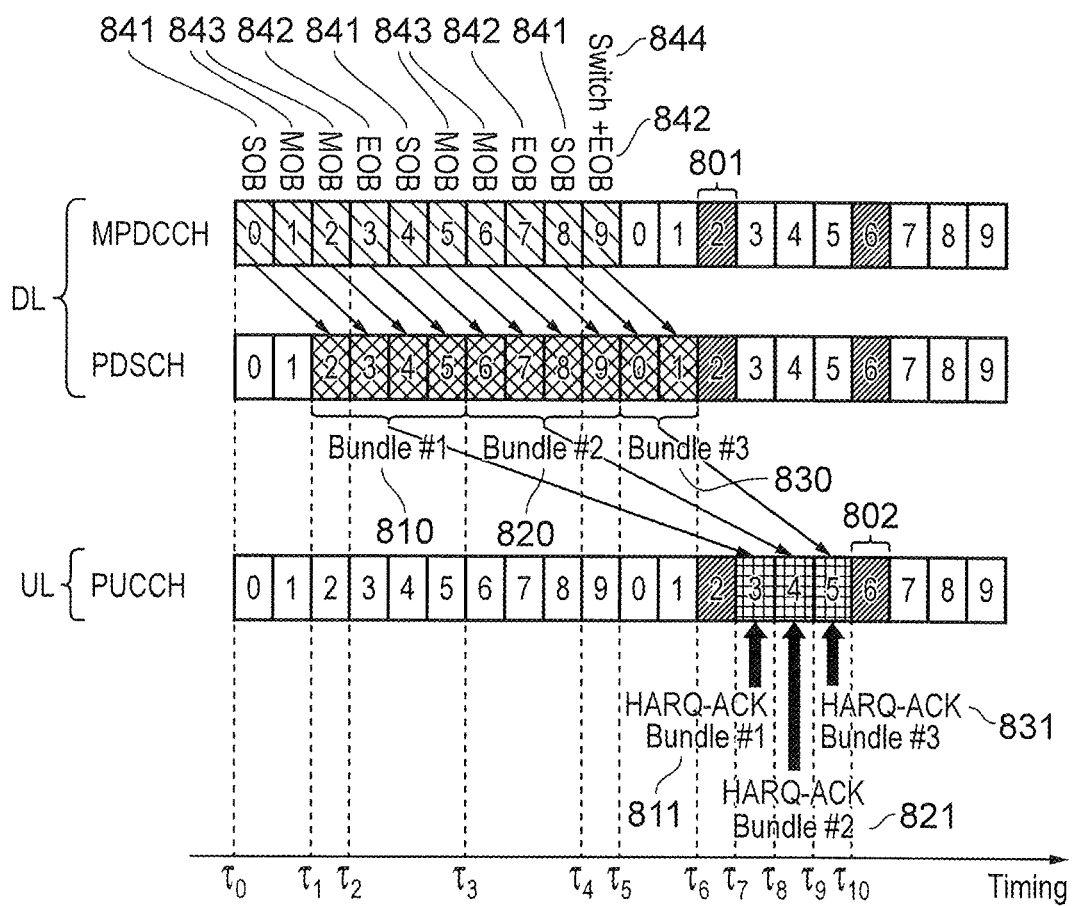
FIG. 8 illustrates an example of a division of PDSCH transmissions into multiple bundles in accordance with embodiments of the present technique.
Figure 9:
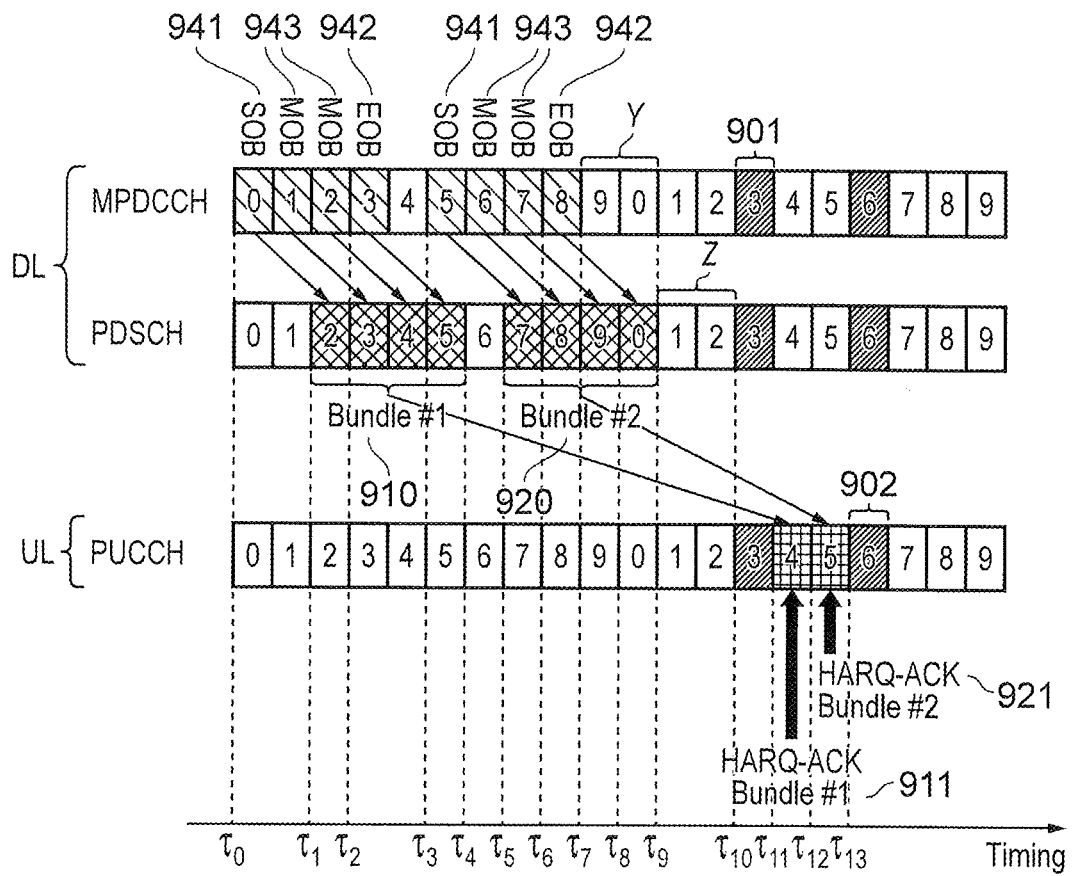
FIG. 9 illustrates an example of an implicit downlink to uplink switch indicator in accordance with embodiments of the present technique.

Specifically, embodiments of the present technique, as shown in FIGS. 7 to 9 (which are described in detail below) relate an infrastructure equipment, or eNodeB, forming part of a wireless telecommunications system, which comprises transmitter circuitry for transmitting signals representing data via a wireless access interface of the wireless telecommunications system to a communications device, or UE, receiver circuitry for receiving signals representing data via the wireless access interface from the communications device, and controller circuitry (which may be a microprocessor, CPU, dedicated chipset, etc.) configured to control the transmitter circuitry and the receiver circuitry to transmit and receive signals via the wireless access interface in accordance with a time divided structure in which the wireless access interface is divided into a plurality of repeating time units, or subframes. The controller circuitry of the infrastructure equipment/eNB is configured to provide, in each of a first plurality of the time units/subframes, one of a plurality of control channels (MPDCCHs) each configured to schedule one of a plurality of data channels (PDSCHs), and to provide, in each of a second plurality of time units/subframes of the signal transmitted to the communications device/UE, one of the plurality of data channels (PDSCHs), the plurality of data channels (PDSCHs) being formed of one or more bundles of data channels (PDSCHs), wherein the controller circuitry is configured to control the transmitter circuitry to transmit a bundle status indicator (PBS) in one or more of the plurality of control channels (MPDCCHs). Embodiments of the present technique also relate to the wireless telecommunications system itself, the wireless telecommunications system comprising both the infrastructure equipment (eNB) and the communications device (UE).

In an embodiment, the PBS consists of an End of Bundle (EOB) indicator. This said EOB indicator would tell the UE whether the PDSCH scheduled by the DCI is the last PDSCH within the bundle. This would avoid the UE missing detection of the last MPDCCH and therefore not decode the last PDSCH in a bundle and sending the PUCCH early. If the UE fails to detect the EOB, it would not transmit a PUCCH to the eNB. If a fixed PUCCH and last PDSCH timing is used, e.g. the PUCCH is transmitted 4 subframes after the last PDSCH in the bundle [4], then using this embodiment, the UE would avoid switching to the uplink and wasting battery power to transmit a PUCCH to carry the HARQ-ACK. An absence of a HARQ-ACK from the UE would indicate a NACK at the eNB. In other words, in this embodiment, the bundle status indicator transmitted in a control channel comprises an end of bundle indicator indicating that a data channel scheduled by the control channel is the last data channel of one of the one or more bundles of data channels.

In another embodiment, the PBS consists of a Start of Bundle (SOB) indicator. The SOB would indicate the start of a PDSCH bundle to the UE. The SOB can be used together with the EOB, for example if the UE fails to detect an EOB but instead receive a SOB at a later subframe, it would know that the previous PDSCH bundle can be discarded since the eNB failing to detect the HARQ-ACK for the previous bundle would retransmit them. Although the DAI, if used for fe-MTC, can act as a SOB (e.g. using DAI=00 as the start of bundle), the DAI has a limitation since it is a 2 bit indicator and is used as a counter for PDSCH bundle size greater than 4 by resetting the counter whenever it reaches the max value. It should be appreciated that the EOB need not work together with the SOB. In other words, in this embodiment, the bundle status indicator transmitted in a control channel comprises a start of bundle indicator indicating that a data channel scheduled by the control channel is the first data channel of one of the one or more bundles of data channels.

In an embodiment the PBS indicates either a bitmap indicating which subframes contain PDSCH within the bundle or the number of consecutive PDSCH within the bundle. The UE would transmit an ACK/NACK in a known subframe after the last PDSCH indicated in this PBS.

The maximum throughput is achieved when PDSCH can be transmitted in consecutive subframes as long as possible, i.e., the largest bundle size would give the highest throughput. The size of the bundle is limited to the number of HARQ processes. In Rel-13 eMTC, the number of HARQ processes is 8, which may be increased to 10 in Rel-14 fe-MTC. Assuming 10 HARQ processes are used, the maximum throughput is achieved when the bundle size is 10 PDSCH as shown in FIG. 7, which illustrates an embodiment of the present technique, where a 10 PDSCH bundle 706 occurs between time $\tau_1$ and $\tau_2$ and the HARQ feedback 704 is transmitted in a bundle between time $\tau_4$ and $\tau_5$. For a maximum TBS of 1000 bits, the PDSCH transmissions in FIG. 7 would give a maximum throughput of 588 kbps. In FIG. 7, DL to UL switching 701 for the transmitting device (the infrastructure equipment/eNB) takes place in subframe 2 of the following radio frame, and UL to DL switching 702 for the receiving device (the communications device/UE) takes place in subframe 6 in the following radio frame.

As described above, HARQ-ACK bundling can cause unnecessary retransmission of PDSCH since the eNB does not know which PDSCH(s) has failed when a NACK is received. It is recognised that the inefficiency of this retransmission increases as the size of the bundle increases, i.e. the long bundle 706 shown in FIG. 7 would lead to inefficient retransmission. Hence, it would be beneficial if the long PDSCH transmission can be divided into multiple bundles without introducing additional delay to the timeline shown in FIG. 7. It is observed in FIG. 7 that the subframes between time $\tau_3$ and $\tau_4$ (subframe 3 & 4) leading to the HARQ-ACK feedback are not utilised. These subframes can be used to provide two more additional HARQ-ACK feedbacks without causing any delay to the timeline. That is, the 10 PDSCH transmissions can be divided into three bundles.

An example is shown in FIG. 8, which illustrates an embodiment of the present technique, where the 10 PDSCH transmissions are divided into Bundle #1 810, Bundle #2 820 and Bundle #3 830. Bundle #1 810 has a bundle size of 4 PDSCH occupying subframe 2, 3, 4 & 5 between time $\tau_1$ and $\tau_2$, Bundle #2 820 has a bundle size of 4 PDSCH occupying subframe 6, 7, 8 & 9 between time $\tau_2$ and $\tau_4$, and Bundle #3 830 has a bundle size of 2 PDSCH occupying subframe 0 & 1 between time $\tau_4$ and $\tau_5$. The corresponding HARQ-ACK bundling feedbacks 811 (for Bundle #1 810), 821 (for Bundle #2 820) and 831 (for Bundle #3 830) are transmitted between time in $\tau_6$ and $\tau_9$ in subframe 3, 4, and 5 respectively. This arrangement gives the maximum throughput with reduced retransmission inefficiency. As with the example shown in FIG. 7, in FIG. 8, DL to UL switching 801 for the transmitting device (the infrastructure equipment/eNB) takes place in subframe 2 of the following radio frame, and UL to DL switching 802 for the receiving device (the communications device/UE) takes place in subframe 6 in the following radio frame.

The EOB and SOB indications in previous embodiments can be used to indicate the start and end of multiple consecutive bundles shown in FIG. 8. For example the DCI carried by the MPDCCH at time $\tau_0$ scheduling the $1^{st}$ PDSCH of Bundle #1 810 can include a SOB 841 indicator and the DCI carried by the MPDCCH at time $\tau_2$ (subframe 3) scheduling the last PDSCH of Bundle #1 810 can include an EOB 842 indicator. In this way the UE knows the split of the bundles. However, the UE still needs to know when to switch to the uplink to transmit the HARQ-ACK feedback. It should be appreciated that the concept of "bundle window" as in LTE TDD is not used in HD-FDD.

Recognising this, in another embodiment, the PBS consists of a Switch indicator. This Switch indicator tells the UE when to switch to the uplink to transmit the HARQ-ACK feedback(s). For example in FIG. 8 this Switch indicator 844 (together with an EOB 842) can be transmitted in the DCI at time $\tau_4$, which tells the UE to switch to the uplink after time $\tau_6$, i.e. after the corresponding PDSCH is received. It should be appreciated that the Switch indicator 844 can be transmitted in other subframes when the eNB decides that the UE needs to provide a feedback. In other words, in this embodiment, the bundle status indicator transmitted in a control channel comprises a switch indicator indicating to the communications device that a next time unit after a data channel scheduled by the control channel is configured for uplink communication to the infrastructure equipment.

In embodiments of the present technique, the PBS consists of a Middle of Bundle (MOB) indicator. This indicator tells the UE that the scheduled PDSCH is neither the end nor the start of the PDSCH bundle and the UE is to expect further PDSCHs. An example is shown in FIG. 8, in the Bundle #1 810, the MOB 843 is transmitted in DCI carried by the MPDCCH in subframe 1 and 2 (that schedule PDSCH in subframe 3 and 4). The UE would therefore understand that these PDSCH are in the middle of a bundle and expect more PDSCH to come. In other words, in this embodiment, the bundle status indicator transmitted in a control channel comprises a middle of bundle indicator indicating that a data channel scheduled by the control channel is neither the first or last data channel of one of the one or more bundles of data channels.

In another embodiment, the Switch indicator further includes a delay of X subframes before the UE switches to the uplink. This delay allows the eNB to provide an uplink grant (e.g. to allocate a PUCCH to transmit the ACK/NACK or a PUSCH for UE's data) for the UE prior to the DL to UL switching. In other words, in this embodiment, the switch indicator indicates a delay of one or more time units after the data channel before the communications device should begin uplink communication to the infrastructure equipment.

In another embodiment, instead of an explicit Switch indicator, the UE can switch to the uplink to transmit the HARQ-ACK bundle if there are no further DCI (carried by MPDCCH) detected for Y subframes after an EOB. The UE would then switch to the uplink Z subframes after the end of the last PDSCH (that correspond to the DCI with the EOB indicator). The values of Y and Z can be specified in the specifications or configured by the eNB using higher layer signalling such as RRC signalling. In other words, in this embodiment, the communications device is configured to detect that a number of time units in which no data has been received from the infrastructure equipment exceeds a predetermined threshold, and to begin, in a predetermined time unit, uplink transmission to the infrastructure equipment. An example where Y=2 & Z=2, is shown in FIG. 9, where two bundles, Bundle #1 910 and Bundle #2 920 are transmitted by the eNB. At time $\tau_0$ a DCI carried by a MPDCCH is transmitted with a SOB 941 indication to indicate the start of a PDSCH bundle. The UE notes the start of the corresponding PDSCH (transmitted at time $\tau_0$ in subframe 2). It then further receives two more MPDCCH scheduling another two more PDSCHs (with MOB 943 indicators) and since no EOB 942 was indicated the UE, expects further PDSCH. At time $\tau_2$ the UE receives an EOB 942 indicator in the DCI carried by MPDCCH in subframe 3, which indicates that the corresponding PDSCH transmitted in subframe 5 at time $\tau_3$ will be the last PDSCH in the bundle (Bundle #1 910). The UE then start the counting down Y=2 subframes to determine whether it should switch to the uplink. The UE did not receive any MPDCCH or DCI at subframe 4 after the EOB 942 was detected in subframe 3. However, at subframe 5 at time $\tau_3$, it detects a DCI with a SOB 941 indicating the start of another bundle (i.e. Bundle #2 920) where the start of the corresponding PDSCH is at time $\tau_5$. At time $\tau_6$, the UE receives an EOB 942 in the DCI carried by MPDCCH in subframe 8. The UE then bundles the PDSCH received between time $\tau_5$ and $\tau_9$ for HARQ-ACK. The UE then starts the countdown for Y=2 subframes after receiving the EOB 942 at time $\tau_7$ and at time $\tau_9$, the countdown ends (i.e. 2 subframes without any DCI detected) and the UE then starts another countdown for Z=2 subframes after the last PDSCH in Bundle #2 920 is received at time $\tau_9$. After Z=2 subframes at time $\tau_{10}$, the UE switches to the uplink to transmit the HARQ-ACK feedbacks 911 and 921 (for Bundle #1 910 and Bundle #2 920 respectively). In FIG. 9, DL to UL switching 901 for the transmitting device (the infrastructure equipment/eNB) takes place in subframe 3 of the following radio frame, and UL to DL switching 902 for the receiving device (the communications device/UE) takes place in subframe 6 in the following radio frame.

In another embodiment the uplink subframe used for HARQ-ACK feedback of a bundle is indicated in the DCI scheduling of the PDSCH bundle. For example, in FIG. 8, one of the DCIs scheduling the PDSCH in Bundle #1 810 can indicate to the UE to transmit its HARQ-ACK feedback 811, 821, 831 between time $\tau_7$ and $\tau_8$, i.e. at subframe 3 of the next radio frame. In other words, in this embodiment, one of the control channels comprises an indication of a time unit in which the communications device should transmit an acknowledgement of one of the bundles of data channels to the infrastructure equipment.

In another embodiment the uplink subframe used for the HARQ-ACK feedback is implicitly indicated by the order of the bundle prior to the UE switching to the uplink. For example in FIG. 8, the order of the PDSCH bundles are Bundle #1 810, Bundle #2 820 and Bundle #3 830. Here the first uplink subframe after the DL-UL switch 801 (between time $\tau_6$ and $\tau_7$) that has a PDSCH and PUCCH separation of at least 3 subframes (for the UE to process the PDSCH) shall be used to feedback 811 the first bundle, i.e. Bundle #1 810. The second available uplink subframe (satisfying the minimum PDSCH-PUCCH separation) would provide feedback 821 for the second bundle, i.e. Bundle #2 820 and the third available uplink subframe would provide feedback 831 for the third bundle, i.e. Bundle #3 830. In other words, in this embodiment, an order of the one or more bundles of data channels indicates to the communications device that the communications device should transmit an acknowledgement of each of the one or more bundles of data channels during a next available time unit for uplink transmission to the infrastructure equipment in the order of the one or more bundles of data channels.

In another embodiment, the PUCCH resource (i.e. frequency and code) used to carry the HARQ-ACK feedback is a function of the number of PDSCH in the bundle. This embodiment is useful if the DAI is not used for fe-MTC and would provide the eNB an indication whether any PDSCH is missing in the bundle. In other words, in this embodiment, the communications device is configured to transmit an acknowledgement of each of the one or more bundles of data channels in a communications resource of the wireless access interface which is a function of the number of data channels in the bundle.

Figure 10:
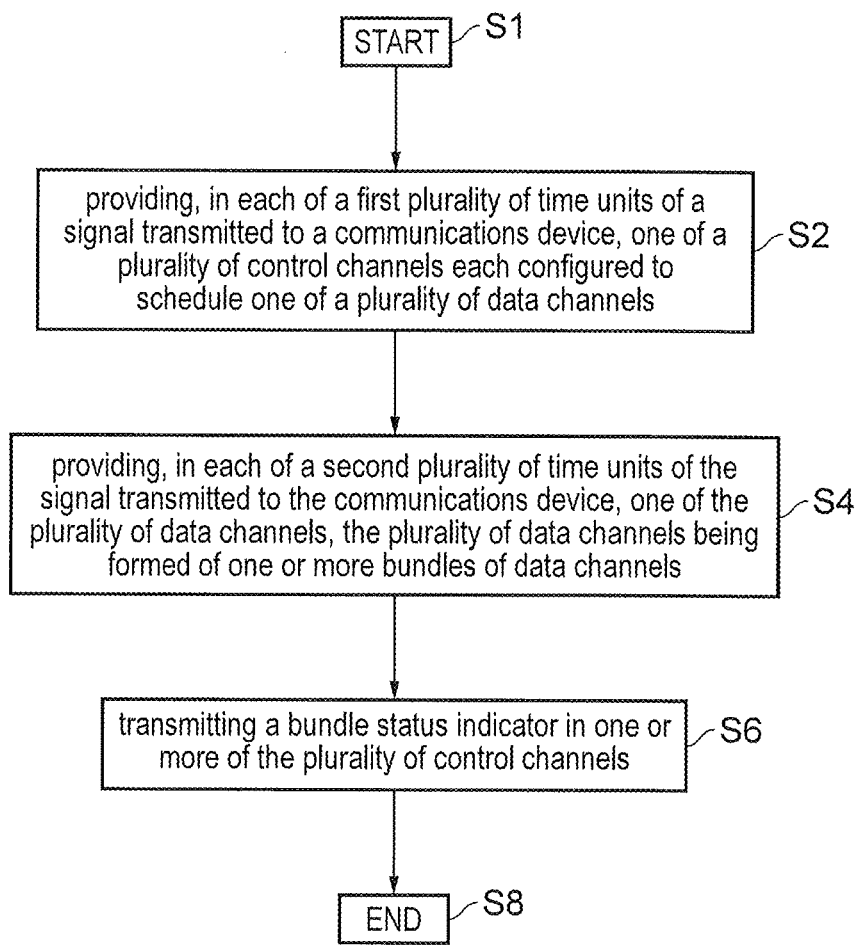
FIG. 10 shows a flow diagram describing a process in accordance with embodiments of the present technique.

FIG. 10 shows a flow diagram describing a process in accordance with embodiments of the present technique, where the process entails a method of controlling communications in a wireless telecommunications system comprising an infrastructure equipment. The method begins in step S1. In step S2, the method comprises providing, in each of a first plurality of time units of a signal transmitted to a communications device, one of a plurality of control channels each configured to schedule one of a plurality of data channels. In step S4, the process comprises providing, in each of a second plurality of time units of the signal transmitted to the communications device, one of the plurality of data channels, the plurality of data channels being formed of one or more bundles of data channels. Step S6 of the method comprises transmitting a bundle status indicator in one or more of the plurality of control channels. The process ends in step S8.

Embodiments of the present disclosure therefore address issues with existing HD-FDD mechanisms and provide a new mechanism with increased efficiency and less restriction on eNB scheduling, which can be used to improve performance and efficiency of MTC or IoT devices.

The following numbered paragraphs provide further example aspects and features of the present technique:

Paragraph 1. An infrastructure equipment forming part of a wireless telecommunications system, the infrastructure equipment comprising
  transmitter circuitry for transmitting signals representing data via a wireless access interface of the wireless telecommunications system to a communications device,
  receiver circuitry for receiving signals representing data via the wireless access interface from the communications device, and
  controller circuitry configured
    to control the transmitter circuitry and the receiver circuitry to transmit and receive signals via the wireless access interface in accordance with a time divided structure in which the wireless access interface is divided into a plurality of repeating time units,
    to provide, in each of a first plurality of the time units, one of a plurality of control channels each configured to schedule one of a plurality of data channels, and
    to provide, in each of a second plurality of time units of the signal transmitted to the communications device, one of the plurality of data channels, the plurality of data channels being formed of one or more bundles of data channels,
    wherein the controller circuitry is configured to control the transmitter circuitry to transmit a bundle status indicator in one or more of the plurality of control channels.

Paragraph 2. An infrastructure equipment according to Paragraph 1, wherein the bundle status indicator transmitted in a control channel comprises an end of bundle indicator indicating that a data channel scheduled by the control channel is the last data channel of one of the one or more bundles of data channels.

Paragraph 3. An infrastructure equipment according to Paragraph 1 or 2, wherein the bundle status indicator transmitted in a control channel comprises a start of bundle indicator indicating that a data channel scheduled by the control channel is the first data channel of one of the one or more bundles of data channels.

Paragraph 4. An infrastructure equipment according to Paragraph 1, 2 or 3, wherein the bundle status indicator transmitted in a control channel comprises a switch indicator indicating to the communications device that a time unit or a next time unit after a data channel scheduled by the control channel is configured for uplink communication to the infrastructure equipment.

Paragraph 5. An infrastructure equipment according to any of Paragraphs 1 to 4, wherein the switch indicator indicates a delay of one or more time units after the data channel before the communications device should begin uplink communication to the infrastructure equipment.

Paragraph 6. An infrastructure equipment according to any of Paragraphs 1 to 5, wherein the bundle status indicator transmitted in a control channel comprises a middle of bundle indicator indicating that a data channel scheduled by the control channel is neither the first or last data channel of one of the one or more bundles of data channels.

Paragraph 7. An infrastructure equipment according to any of Paragraphs 1 to 6, wherein one of the control channels comprises an indication of a time unit in which the communications device should transmit an acknowledgement of one of the bundles of data channels to the infrastructure equipment.

Paragraph 8. An infrastructure equipment according to any of Paragraphs 1 to 7, wherein an order of the one or more bundles of data channels indicates to the communications device that the communications device should transmit an acknowledgement of each of the one or more bundles of data channels during a next available time unit for uplink transmission to the infrastructure equipment in the order of the one or more bundles of data channels.

Paragraph 9. A wireless telecommunications system comprising an infrastructure equipment and a communications device, the infrastructure equipment comprising
  transmitter circuitry for transmitting signals representing data via a wireless access interface of the wireless telecommunications system to the communications device,
  receiver circuitry for receiving signals representing data via the wireless access interface from the communications device, and
  controller circuitry configured
    to control the transmitter circuitry and the receiver circuitry to transmit and receive signals via the wireless access interface in accordance with a time divided structure in which the wireless access interface is divided into a plurality of repeating time units,
    to provide, in each of a first plurality of the time units, one of a plurality of control channels each configured to schedule one of a plurality of data channels, and
    to provide, in each of a second plurality of time units of the signal transmitted to the communications device, one of the plurality of data channels, the plurality of data channels being formed of one or more bundles of data channels,
    wherein the controller circuitry is configured to control the transmitter circuitry to transmit a bundle status indicator in one or more of the plurality of control channels.

Paragraph 10. A wireless telecommunications system according to Paragraph 9, wherein the communications device is configured
  to detect that a number of time units in which no data has been received from the infrastructure equipment exceeds a predetermined threshold, and to begin, in a predetermined time unit, uplink transmission to the infrastructure equipment.

Paragraph 11. A wireless telecommunications system according to Paragraph 9 or 10, wherein the communications device is configured to transmit an acknowledgement of each of the one or more bundles of data channels in a communications resource of the wireless access interface which is a function of the number of data channels in the bundle.

Paragraph 12. A wireless telecommunications system according to Paragraph 9, 10 or 11, wherein the bundle status indicator transmitted in a control channel comprises an end of bundle indicator indicating that a data channel scheduled by the control channel is the last data channel of one of the one or more bundles of data channels.

Paragraph 13. A wireless telecommunications system according to any of Paragraphs 9 to 12, wherein the bundle status indicator transmitted in a control channel comprises a start of bundle indicator indicating that a data channel scheduled by the control channel is the first data channel of one of the one or more bundles of data channels.

Paragraph 14. A wireless telecommunications system according to any of Paragraphs 9 to 13, wherein the bundle status indicator transmitted in a control channel comprises a switch indicator indicating to the communications device that a next time unit after a data channel scheduled by the control channel is configured for uplink communication to the infrastructure equipment.

Paragraph 15. A method of controlling communications in a wireless telecommunications system comprising an infrastructure equipment, the method comprising providing, in each of a first plurality of time units of a signal transmitted to a communications device, one of a plurality of control channels each configured to schedule one of a plurality of data channels, providing, in each of a second plurality of time units of the signal transmitted to the communications device, one of the plurality of data channels, the plurality of data channels being formed of one or more bundles of data channels, and transmitting a bundle status indicator in one or more of the plurality of control channels.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.

[2] RP-161324, "New work item proposal. Enhancements of NB-IoT," Vodafone, Huawei, HiSilicon, Ericsson, Qualcomm, RAN #72

[3] RP-161321, "New WI proposal on Further Enhanced MTC", Ericsson, RAN #72

[4] R1-166660 "Higher data rate for feMTC," Sony, RAN1#86

[5] R1-167352, "Views on techniques to improve the data rate for Rel-14 MTC," NTT DOCOMO, RAN1#86

[6] R1-081373, "Explicit DTX Signaling with ACK/NAK Bundling in TDD," Texas Instruments, Huawei, RAN1#52bis

What is claimed is:

1. An infrastructure equipment forming part of a wireless telecommunications system, the infrastructure equipment comprising:

circuitry configured to transmit and receive signals via a wireless access interface, wherein the wireless access interface is divided into a plurality of repeating time units, and transmit a bundle status indicator in one or more of a plurality of control channels provided in each of the plurality of repeating time units, wherein the bundle status indicator includes a switch indicator.

2. The infrastructure equipment according to claim 1, wherein the bundle status indicator transmitted in a control channel comprises an end of bundle indicator indicating that a data channel scheduled by the control channel is the last data channel of one of the one or more bundles of data channels.

3. The infrastructure equipment according to claim 1, wherein the bundle status indicator transmitted in a control channel comprises a start of bundle indicator indicating that a data channel scheduled by the control channel is the first data channel of one of the one or more bundles of data channels.

4. The infrastructure equipment according to claim 1, wherein the switch indicator indicates to the communications device that a time unit after a data channel scheduled by the control channel is configured for uplink communication to the infrastructure equipment.

5. The infrastructure equipment according to claim 4, wherein the switch indicator indicates a delay of one or more time units after the data channel before the communications device should begin uplink communication to the infrastructure equipment.

6. The infrastructure equipment according to claim 1, wherein the bundle status indicator transmitted in a control channel comprises a middle of bundle indicator indicating that a data channel scheduled by the control channel is neither the first or last data channel of one of the one or more bundles of data channels.

7. The infrastructure equipment according to claim 1, wherein one of the control channels comprises an indication of a time unit in which the communications device should transmit an acknowledgement of one of the bundles of data channels to the infrastructure equipment.

8. The infrastructure equipment according to claim 1, wherein an order of the one or more bundles of data channels indicates to the communications device that the communications device should transmit an acknowledgement of each of the one or more bundles of data channels during a next available time unit for uplink transmission to the infrastructure equipment in the order of the one or more bundles of data channels.

9. A wireless telecommunications system comprising an infrastructure equipment and a communications device, the infrastructure equipment comprising:
  circuitry configured to
    transmit and receive signals via a wireless access interface, wherein the wireless access interface is divided into a plurality of repeating time units, and
    transmit a bundle status indicator in one or more of a plurality of control channels provided in each of the plurality of repeating time units, wherein the bundle status indicator includes a switch indicator.

10. The wireless telecommunications system of claim 9, wherein the bundle status indicator transmitted in a control channel comprises an end of bundle indicator indicating that a data channel scheduled by the control channel is the last data channel of one of the one or more bundles of data channels.

11. The wireless telecommunications system of claim 9, wherein the bundle status indicator transmitted in a control channel comprises a start of bundle indicator indicating that a data channel scheduled by the control channel is the first data channel of one of the one or more bundles of data channels.

12. The wireless telecommunications system of claim 9, wherein the switch indicator indicates to the communications device that a time unit after a data channel scheduled by the control channel is configured for uplink communication to the infrastructure equipment.

13. The wireless telecommunications system of claim 12, wherein the switch indicator indicates a delay of one or more time units after the data channel before the communications device should begin uplink communication to the infrastructure equipment.

14. The wireless telecommunications system of claim 9, wherein the bundle status indicator transmitted in a control channel comprises a middle of bundle indicator indicating that a data channel scheduled by the control channel is neither the first or last data channel of one of the one or more bundles of data channels.

15. The wireless telecommunications system of claim 9, wherein one of the control channels comprises an indication of a time unit in which the communications device should transmit an acknowledgement of one of the bundles of data channels to the infrastructure equipment.

16. The wireless telecommunications system of claim 9, wherein an order of the one or more bundles of data channels indicates to the communications device that the communications device should transmit an acknowledgement of each of the one or more bundles of data channels during a next available time unit for uplink transmission to the infrastructure equipment in the order of the one or more bundles of data channels.

17. The wireless telecommunications system of claim 9, wherein the communications device is configured to
  detect that a number of time units in which no data has been received from the infrastructure equipment exceeds a predetermined threshold, and
  begin, in a predetermined time unit, uplink transmission to the infrastructure equipment.

18. A method of controlling communications in a wireless telecommunications system comprising an infrastructure equipment, the method comprising:
  providing, in each of a plurality of time units of a signal transmitted to a communications device, one of a plurality of control channels each configured to schedule one of a plurality of data channels; and
  transmitting a bundle status indicator in one or more of the plurality of control channels, wherein the bundle status indicator includes a switch indicator.

* * * * *